Patented June 10, 1941

2,245,299

UNITED STATES PATENT OFFICE 2,245,299

DERIVATIVE OF PREGNENE

Tadeus Reichstein, Basel, Switzerland, assignor to Roche-Organon, Inc., Nutley, N. J.

No Drawing. Original application March 10, 1938, Serial No. 195,161. Divided and this application February 9, 1939, Serial No. 255,482. In Switzerland March 22, 1937

10 Claims. (Cl. 260—397.1)

This invention relates to the preparation of certain new chemical compounds that are useful for biological purposes and particularly to the preparation of the acid halides of such compounds as etiocholenic and etiocholanic acids and their derivatives, which acid halides are especially useful as intermediate products from which other biologically active compounds may be made.

Compounds with a pregnane or pregnene skeleton (Formula I) have heretofore either been isolated from natural sources or produced by oxidative decomposition from higher molecular substances. The production of such derivatives as are substituted in the carbon atom $C_{21}$ by a halogen or by oxygen, e. g. a hydroxyl group, has not been described at all.

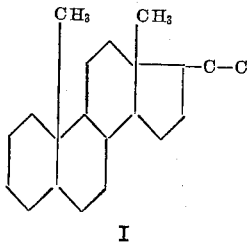

I

It has now been found that valuable derivatives having the characteristic pregnene structure with at least two carbon atoms in the side chain attached to the cyclo-pentane ring can be formed from etiocholanic acid or etiocholenic acid or their derivatives by first forming the acid chloride or other acid halide of the derivative and subsequently converting the halide into the desired derivative having a pregnane structure.

To form the acid chloride is somewhat of a problem since the structures of etiocholanic and etiocholenic acid are rather delicate and those of their derivatives are even more so. It has been found, however, that, if in the case of oxygenous derivatives such as those having additional hydroxy groups, the compounds are first protected by acylating or alkylating at the additional oxygen, the resulting compound or the etiocholenic or etiocholanic acid, can then be converted into an acid halide by treatment with a mild halogenating agent such as thionyl chloride.

As an example of the preparation of an acid halide of this type the following is given:

One gram of 3-acetoxy-aetio-cholenic acid is boiled with reflux for 3 hours with 5 ml. of benzene and 5 grams of very pure thionyl chloride. Then the mixture is evaporated, humidity being excluded, upon which the acid chloride soon crystallizes. The weakly yellow product does not show a distinct melting point but decomposes at different temperatures depending on the velocity of heating. Sometimes melting at 160° C. may be observed followed by resolidifying and eventually melting again of the decomposed mass at a temperature of over 300° C.

From the acid halides of the type prepared according to this invention, many new and useful compounds may be prepared. For example, to convert the chloride prepared according to the preceding example into an acetate it is dissolved in 80 ml. of dry ether and then poured into a dry ethereal solution of 1–1.5 grams of diazomethane, the temperature being —10° C. The mixture is left to stand for some hours at 0° C., then for 6 hours at room temperature after which it is concentrated. Petroleum ether is added until a turbidity occurs. The diazo ketone crystallizes. From the mother liquor additional amounts are obtained in analogous ways. Yield 0.7 of a pure product, weakly, pale yellow leaflets, melting point approaching 150° C. somewhat different depending on the velocity of heating.

For the preparation of the free diazo-21-pregnene-5-ol-3-one-20, one g. of the above acetate is suspended in 30 ml. of methanol, 16 ml. of a 5% solution of potassium hydroxide in methanol are added and the mixture is left to stand at room temperature for 6 hours with occasional agitation. The crystals dissolve after about half an hour. Then some water is added and after concentration in vacuo the oxy-diazo ketone crystallizes. It is filtered with suction, washed with water and dried in vacuo; it can be recrystallized from ether-petroleum ether, it then being obtained in pale yellow lustrous grains melting at 144° C. with vigorous decomposition; upon slow heating the melting point can be found lower. The yield is almost quantitative. The product is distinguished from the acylated diazo ketone by its being precipitated by digitonine from an 80–90% alcoholic solution.

Analogous reactions may be carried out starting with 3-oxy-aetio-allo-cholanic acid and with other substituted derivatives of the aetio-cholanic or cholenic acid series carrying further substituents in the ring system besides those at the carbon atom $C_3$ especially one or more substituents selected from the class consisting of -hydroxyl, -acyloxyl, or -alkoxyl groups.

Many other compounds may be manufactured from the types exemplified and some of these are described in application 195,161 of which this application is a division.

I claim:

1. The acid halides of the Δ-5-6 cyclopentano-dimethyl-polyhydro-phenanthrene carboxylic acids-17.

2. The acid halides of the unsaturated cyclopentano-dimethyl-polyhydro-phenanthrene carboxylic acids-17.

3. The acid halides of the unsaturated cyclopentano-dimethyl-polyhydro-phenanthrene carboxylic acids-17 having a double bond between the carbon atom $C_5$ and an adjacent carbon atom, and having a substituent attached to the carbon atom $C_3$ selected from the class consisting of -hydroxyl, -acyloxyl, and -alkoxyl.

4. As a new compound acetoxy-3-etiocholen-5-ic-acid chloride-17 having the formula $C_{22}H_{31}O_3Cl$ and the structure

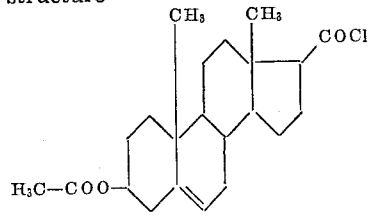

which is soluble in ether, whose melting point depends on the heating velocity, and when heating rather quickly a melting point at 160° C. is observed whereupon solidification occurs and a second melting point of the decomposed mass is observed.

5. A process which comprises treating the carboxylic acid-17 of the Δ-5-6 cyclopentano-dimethyl-polyhydro-phenanthrene series with a mild halogenating agent.

6. A process which comprises treating an unsaturated cyclopentano-dimethyl-polyhydro-phenanthrene carboxylic acid-17 with a mild halogenating agent.

7. A process which comprises treating an unsaturated cyclopentano-dimethyl-polyhydro-phenanthrene carboxylic acid-17 having a double bond between the carbon atom $C_5$ and an adjacent carbon atom and having further a substituent selected from the class consisting of -hydroxyl, -acyloxyl, and -alkoxyl attached to the carbon atom $C_3$, with a mild halogenating agent.

8. The process of claim 7 in which the halogenating agent is thionyl chloride.

9. The process of claim 7 in which a 3-acyloxy-etio-cholenic acid is used as a starting material.

10. A process of claim 7 in which a 3-acyloxy-etio-cholenic acid is treated with thionyl chloride.

TADEUS REICHSTEIN.